(12) United States Patent
Kogo et al.

(10) Patent No.: US 7,401,959 B2
(45) Date of Patent: Jul. 22, 2008

(54) TURN SIGNAL LAMP FOR A VEHICLE

(75) Inventors: Satoshi Kogo, Saitama (JP); Hayato Ohashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/529,670

(22) Filed: Sep. 28, 2006

(65) Prior Publication Data

US 2007/0076421 A1 Apr. 5, 2007

(30) Foreign Application Priority Data

Oct. 5, 2005 (JP) .............................. 2005-293055

(51) Int. Cl.
 *B60Q 1/26* (2006.01)
 *F21S 8/10* (2006.01)
 *F21V 7/00* (2006.01)

(52) U.S. Cl. ........................ 362/540; 362/545; 362/518; 362/548; 362/800

(58) Field of Classification Search ................ 362/540, 362/543–545, 473, 506, 516–519, 548, 549, 362/800, 520–522
See application file for complete search history.

(56) References Cited

U.S. PATENT DOCUMENTS

| | | | | |
|---|---|---|---|---|
| 4,855,877 A | * | 8/1989 | Otaka | 362/509 |
| 4,929,866 A | * | 5/1990 | Murata et al. | 313/500 |
| 5,241,457 A | * | 8/1993 | Sasajima et al. | 362/503 |
| 5,471,371 A | * | 11/1995 | Koppolu et al. | 362/555 |
| 6,099,156 A | * | 8/2000 | Jenkins et al. | 362/511 |
| 6,280,480 B1 | * | 8/2001 | Tuttle et al. | 362/518 |
| 6,612,728 B2 | * | 9/2003 | Roller et al. | 362/521 |
| 6,796,695 B2 | * | 9/2004 | Natsume | 362/518 |
| 6,805,476 B2 | * | 10/2004 | Amano | 362/545 |
| 6,814,475 B2 | * | 11/2004 | Amano | 362/487 |
| 6,814,480 B2 | * | 11/2004 | Amano | 362/545 |
| 6,848,820 B2 | * | 2/2005 | Natsume | 362/545 |
| 7,059,754 B2 | * | 6/2006 | Lekson et al. | 362/545 |
| 7,070,311 B2 | * | 7/2006 | Lee | 362/545 |
| 2001/0010633 A1 | * | 8/2001 | Apfelbeck | 362/494 |

FOREIGN PATENT DOCUMENTS

JP 2000-123610 4/2000

* cited by examiner

*Primary Examiner*—John A. Ward
*Assistant Examiner*—David R Crowe
(74) *Attorney, Agent, or Firm*—Carrier, Blackman & Associates, P.C.; William D. Blackman; Joseph P. Carrier

(57) ABSTRACT

A turn signal lamp for a vehicle is provided having an improved appearance. In a front blinker including a lamp housing, an LED provided on the lamp housing, a reflector for reflecting light from the LED, and a lens fitted into an opening of the lamp housing, a reflector has a concave curved surface which functions as a reflecting surface and the LED is located in an area invisible from a direction in which light is reflected by the curved surface so that the LED is invisible through the lens from outside the front blinker.

20 Claims, 10 Drawing Sheets

US 7,401,959 B2

TURN SIGNAL LAMP FOR A VEHICLE

CROSS-REFERENCE TO RELATED APPLICATIONS

The present invention claims priority under 35 USC 119 based on Japanese patent application No. 2005-293055, filed on Oct. 5, 2005. The subject matter of this priority document is incorporated by reference herein.

BACKGROUND OF THE INVENTION

1. Field of the Invention

The present invention relates to vehicular turn signal lamps. More particularly, the present invention relates to vehicular turn signal lamps using light-emitting diodes (LEDs) as a light source.

2. Description of the Background Art

Among related vehicle lamp fittings such as turn signal lamps for vehicles, those which use light-emitting diodes (LEDs) as light sources are well known. Such a vehicle lamp fitting is disclosed, for example, in JP-A No. 2000-123610.

FIG. 2 of JP-A No. 2000-123610 is reproduced herein as FIG. 15, in which the reference numbers have been modified to avoid duplication with the reference numbers of the other figures.

FIG. 15 shows a vehicle lamp fitting in which a plurality of small boxes 314, with their open front surfaces oriented in a direction, are arranged on the inner side of an outer lens 311 along the curved surface of the outer lens 311 in a staircase pattern. An LED 315 is placed inside each of the small boxes 314, and a lens 316 covering the front of the LED 315 is placed in the open portion of each small box 314.

When the above lamp fitting is seen from front, if the outer lens 311 and the lenses 316 are transparent, the plurality of LEDs 315 are visible through these lenses 311, 316 from outside, unfavorably affecting the appearance.

An object of the present invention is to improve the appearance of a turn signal lamp.

SUMMARY

A first aspect of the invention is characterized in that in a turn signal lamp for a vehicle, the turn signal lamp including a lamp housing, LEDs provided on the lamp housing, a reflector situated in the lamp housing to reflect light from the LEDs, a plurality of tubular LED holders; and a lens fitted into an opening of the lamp housing, the reflector has concave curved surfaces which function as reflecting surfaces, and the LEDs are located in an area invisible from a direction in which light is reflected by these curved surfaces.

Functionally, since the LED light sources are invisible from outside the turn signal lamp for a vehicle, the appearance is improved.

A second aspect of the invention is characterized in that the plurality of curved surfaces are arranged in a staircase pattern in a vehicle width direction as viewed from above, one curved surface is provided for one LED, and a surface of the lens both sideward of the vehicle and obliquely backward.

Functionally, light from an LED is reflected by the curved surface corresponding to that LED and goes forward of the vehicle or sideward of the vehicle. Since the reflector curved surfaces are arranged in a staircase pattern in the vehicle width direction as viewed from above, and since the lens surface extends both sideward of the vehicle and obliquely backward, light reflected by the curved surfaces is visible not only from forward of the vehicle but also from sideward of the vehicle.

A third aspect of the invention is characterized in that the LEDs are located on the top of the lamp housing.

Functionally, when the turn signal lamp is seen from outside, the LEDs on the top of the lamp housing are minimally visible through the lens from a person's eyes which are normally above the turn signal lamp, so that the appearance is improved.

According to the first aspect of the invention, since the reflector has concave curved surfaces which function as reflecting surfaces and the LEDs are located in an area invisible from a direction in which light is reflected by these curved surfaces, the LEDs are invisible when the turn signal lamp is seen from outside and the appearance is thus improved.

According to the second aspect of the invention, since the plurality of curved surfaces are arranged in a staircase pattern in the vehicle width direction as viewed from above and one curved surface is provided for one LED and a surface of the lens extends both sideward of the vehicle and obliquely backward, reflected LED light is visible from forward of the vehicle and sideward of the vehicle and the visibility of the turn signal lamp is thus improved.

According to the third aspect of the invention, since the LEDs are located on the top of the lamp housing, the LEDs on the top of the lamp housing are hardly visible from a level higher than the turn signal lamp and the appearance is thus improved.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Figure 1:
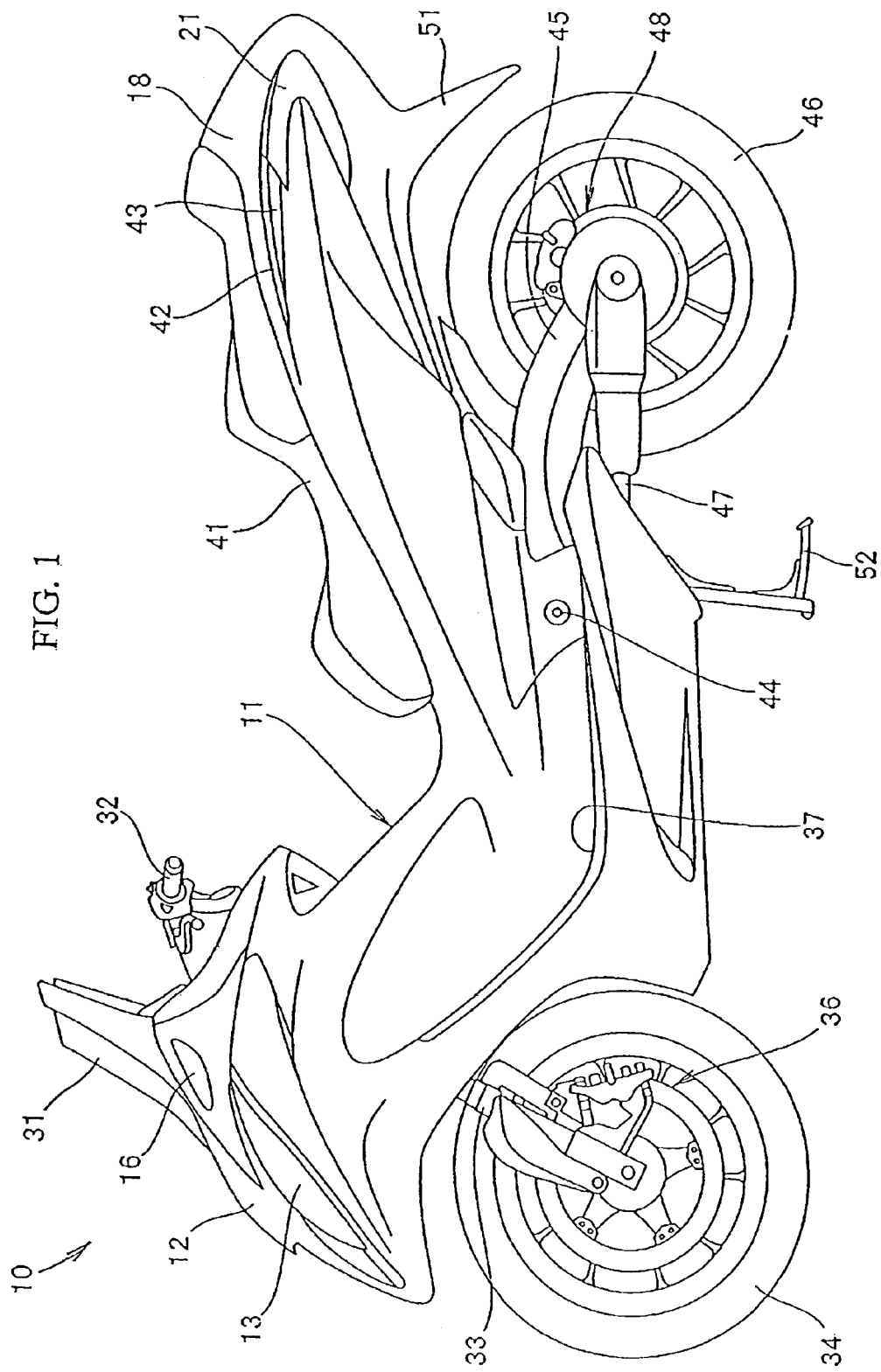
FIG. 1 is a side view of a vehicle with turn signal lamps according to the present invention.

A best mode for carrying out the present invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. The drawings should be seen according to the orientations of the reference numerals.

FIG. 1 is a side view of a vehicle 10 with a turn signal lamp 16 according to the present invention. The vehicle 10 is a scooter-type motorcycle, in which a pair of left and right headlamps 13, 14 (only numeral 13 on the nearer side is shown) and a pair of left and right front blinkers 16, 17 as turn signal indicator lamps (only numeral 16 on the nearer side is shown) are disposed on a front cover 12. Throughout the present specification, the terms "blinker" and "turn signal indicator lamp" will be used interchangeably to mean the same thing.

The front cover 12 constitutes a front portion of a body cover 11. The vehicle 10 also includes a pair of left and right rear combination lamps 21, 22 (only numeral 21 on the nearer side is shown) disposed on a rear cover member 18. The rear cover 18 constitutes a back portion of the body cover 11. In the vehicle 10, the headlamps 13, 14, front turn signal lamps 16, 17 and rear combination lamps 21, 22 each use LEDs (light-emitting diodes) as light sources.

The vehicle 10 includes a windshield 31 provided on the top of the front cover 12, a handlebar 32, a front fork 33 to be steered by the handlebar 32, a front wheel 34 fitted to the bottom of the front fork 33, and a disc brake 36 for the front wheel. The vehicle 10 further includes a floor step 37 on which the rider rests his/her feet, a tandem seat 41, a pair of left and right grab rails 42, 42 (only numeral 42 on the nearer side is shown) located inside the rear cover member 18, and openings 43, 43 (only numeral 43 on the nearer side is shown) through which hands are inserted to reach the grab rails 42, 42. The vehicle 10 still further includes a pivot shaft 44 provided on a body frame (not shown), a swing arm 45 swingably fitted to the pivot shaft 44, a rear wheel 46 fitted to the rear end of the swing arm 45, a drive shaft 47 which transmits power from a power unit (not shown) to the rear wheel 46, a disc brake 48 for the rear wheel, a rear fender 51 which covers the top of the rear wheel 46, and a stand 52.

Figure 2:
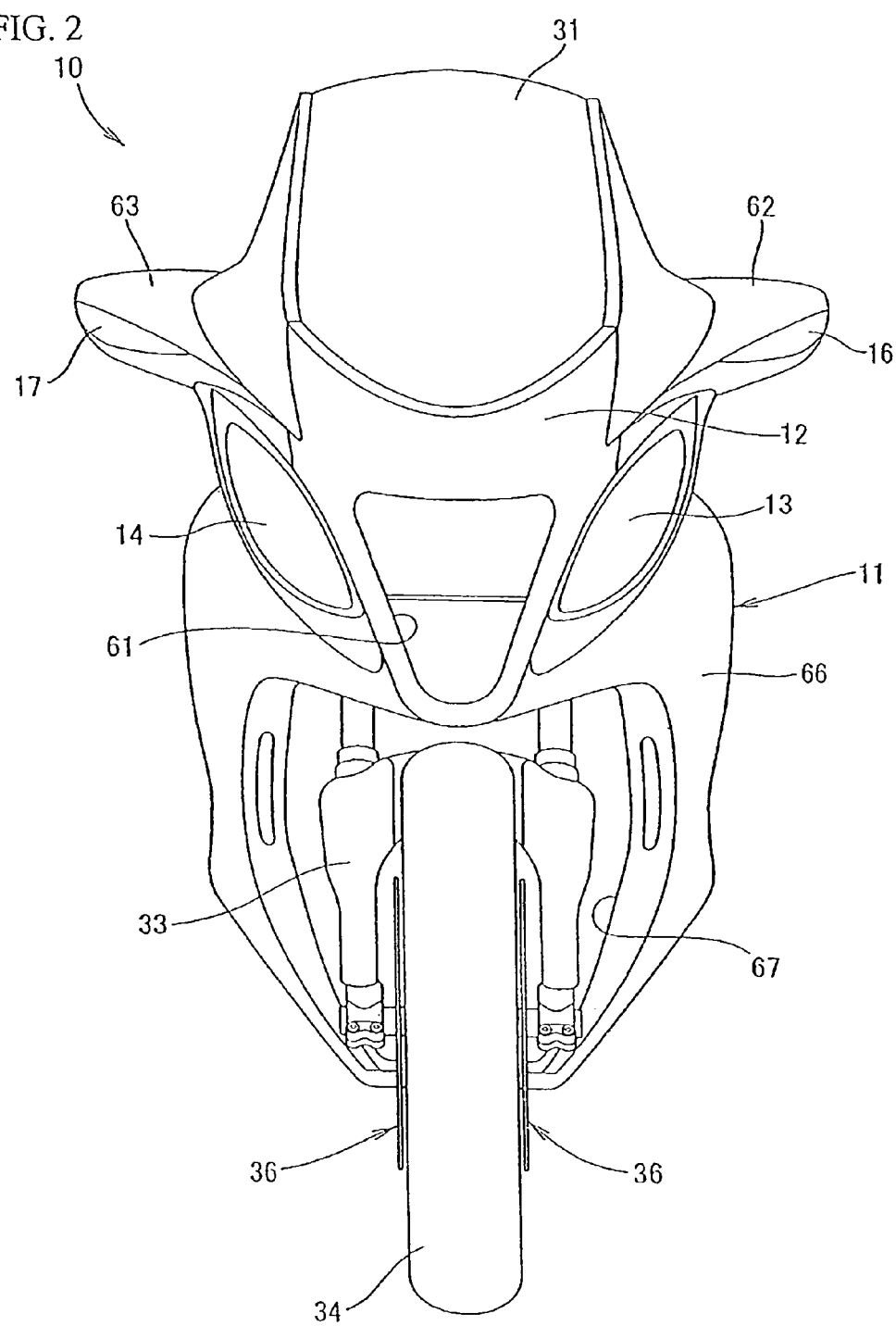
FIG. 2 is a front view of the vehicle of FIG. 1, showing a turn signal lamp provided on each right and left side lateral protrusions of the front cover.

FIG. 2 is a front view of the vehicle 10 according to the present invention where the headlamps 13, 14 of the vehicle 10 are located on the left and right of an opening 61 made in the front cover 12, and the front blinkers 16, 17 are located on lateral protrusions 62, 63 above the headlamps 13, 14 on the left and right sides of the front cover 12.

As shown in FIG. 2, a front lower cover 66 is located below the front cover 12 and is another constituent of the body cover 11. An opening 67 is provided in the front of the front lower cover 66. The openings 61, 67 are intended to take air into the body cover 11 during forward travel of the vehicle, and the trapped air is used, for example, to promote heat radiation of the power unit.

Figure 3:
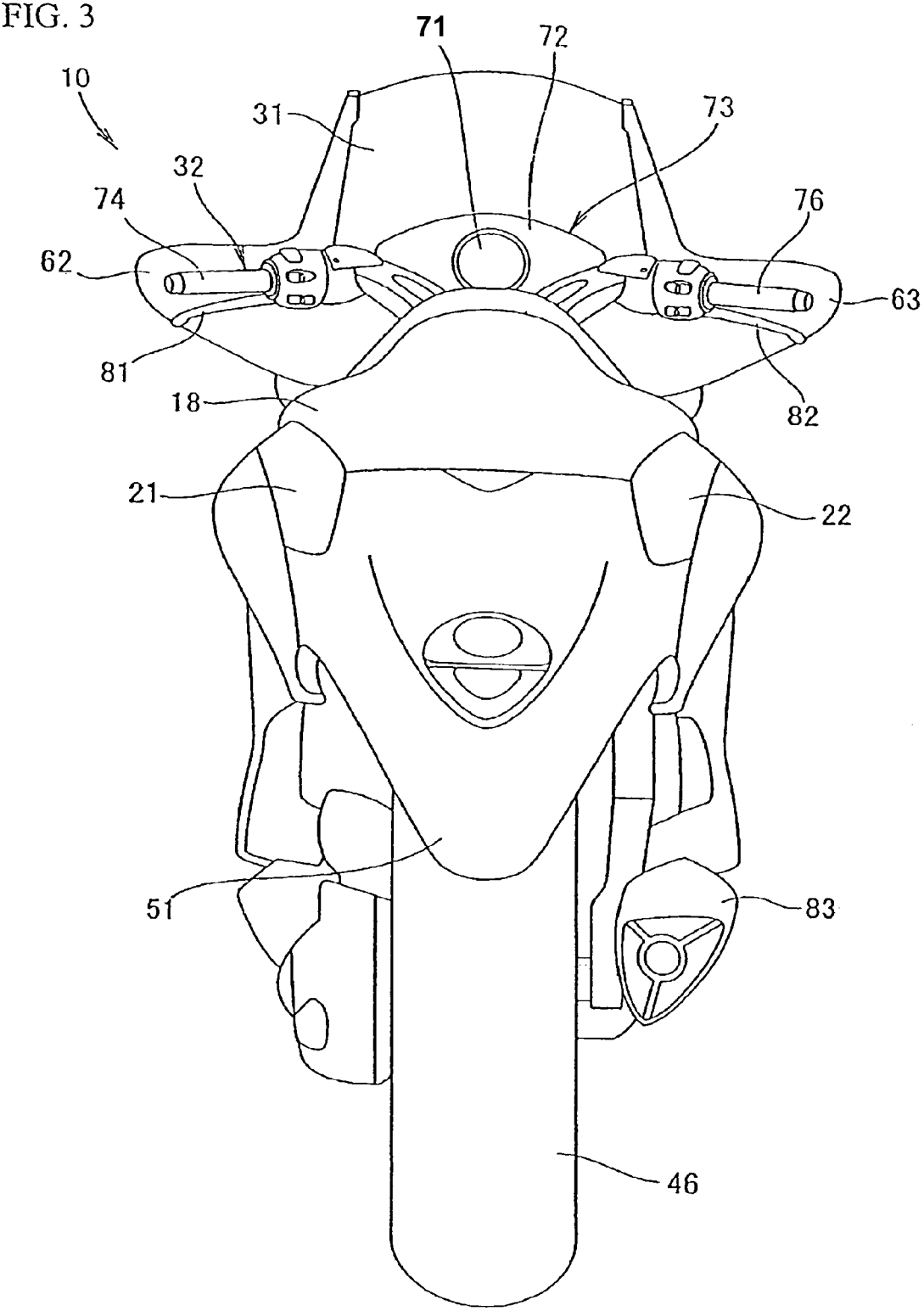
FIG. 3 is a rear view of the vehicle of FIG. 1, showing rear combination lamps provided on each right and left side of the rear cover.

FIG. 3 is a rear view of a vehicle according to the present invention showing that a display unit 73 composed of a meter 71 and an EL (Electro-Luminescence) indicator 72 is located behind the windshield 31 and in front of the handlebar 32. It is also shown that the lateral protrusions 62, 63 cover front surfaces of the front of grips 74, 76 at the left and right ends of the handlebar 32. A clutch lever 81, a front brake lever 82, and an exhaust system muffler 83 are also provided on the vehicle 10.

The rear combination lamps 21, 22 are located on the left and right sides, respectively, of the rear cover member 18. The rear combination lamps 21, 22 each provide the functions of a tail lamp, a stop lamp, and a rear blinker.

The detailed structure of the vehicle 10 will be described next.

Figure 4:
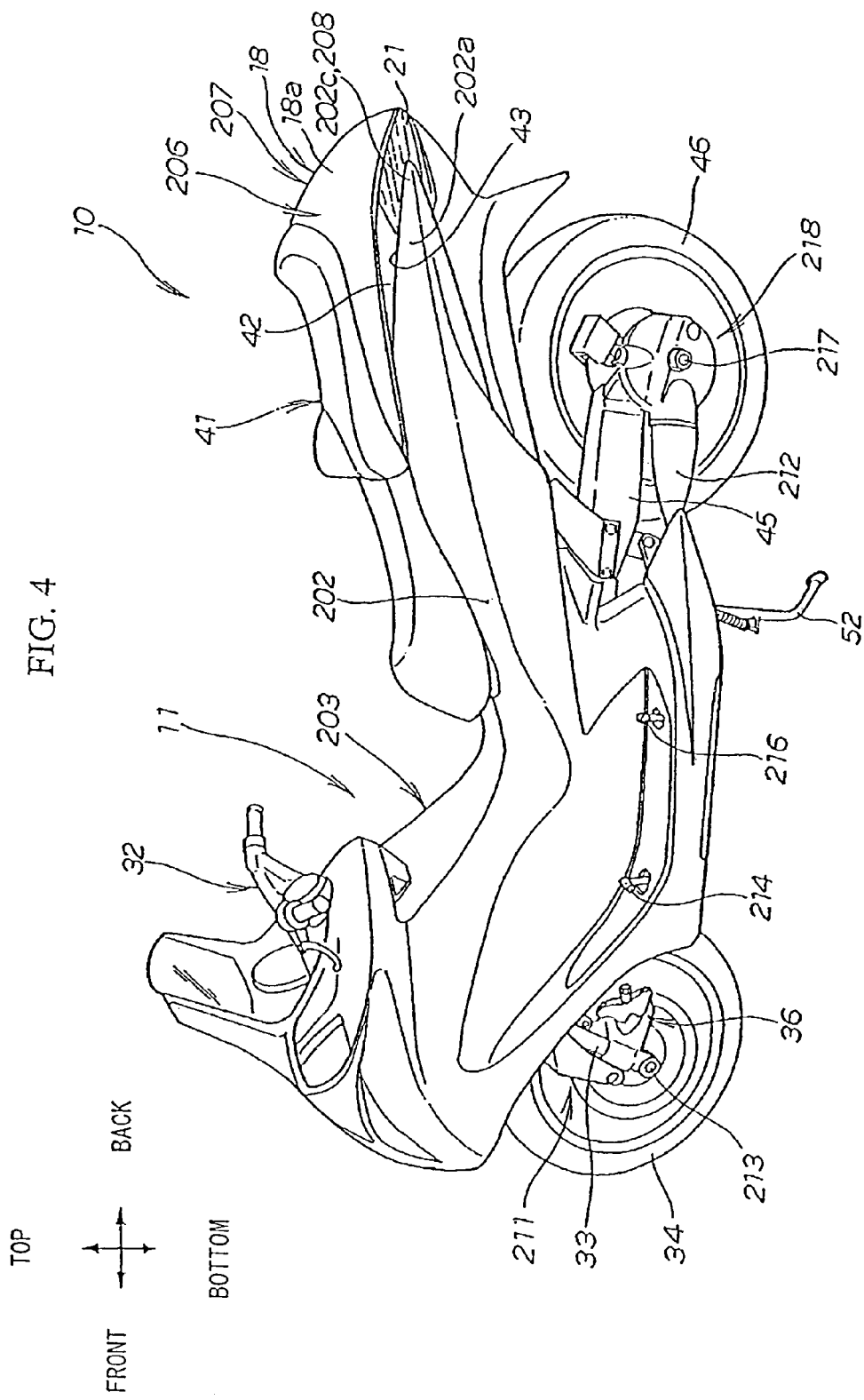
FIG. 4 is a side perspective view of the vehicle of FIG. 1, showing additional detail of the body cover.

FIG. 4 is an external view of the vehicle 10 according to the present invention where the body cover 11, partially covering the vehicle 10, also functions as a cowl member and is fitted to the body frame (not shown). The body cover 11 includes a body cover member 202 covering the area from its front to its back, a leg path cover member 203 located below a leg path space through which the rider passes his/her leg when riding or dismounting, and a rear cover member 18 which is located behind and above the body cover member 202 and covers the bottom of a tandem seat 41.

Since a surface 18a of the rear cover member 18 is smoothly continuous with a surface 202a of the back 202c of the body cover member 202 when viewed from side, the rear cover member 18 and the back 202c of the body cover member 202 have the appearance of a single united body when the tandem seat 41 is closed, and can be considered to constitute a seat cowl 206 for the vehicle as a whole.

Therefore, the rear cover member 18 can be considered as an upper seat cowl 207 and the back 202c of the body cover member 202 can be considered as a lower seat cowl 208.

Also shown in FIG. 4 are a chipping guard 211 covering a sliding part of the front fork 33, a drive shaft cover 212 covering the drive shaft 47 (see FIG. 1), the axle 213 of the front wheel 34, treadle parts 214 and 216 at the front and rear edges of a change pedal, the axle 217 of the rear wheel 46, and a drive case 218 which connects the drive shaft 47 (see FIG. 1) and the rear wheel 46.

Figure 5:
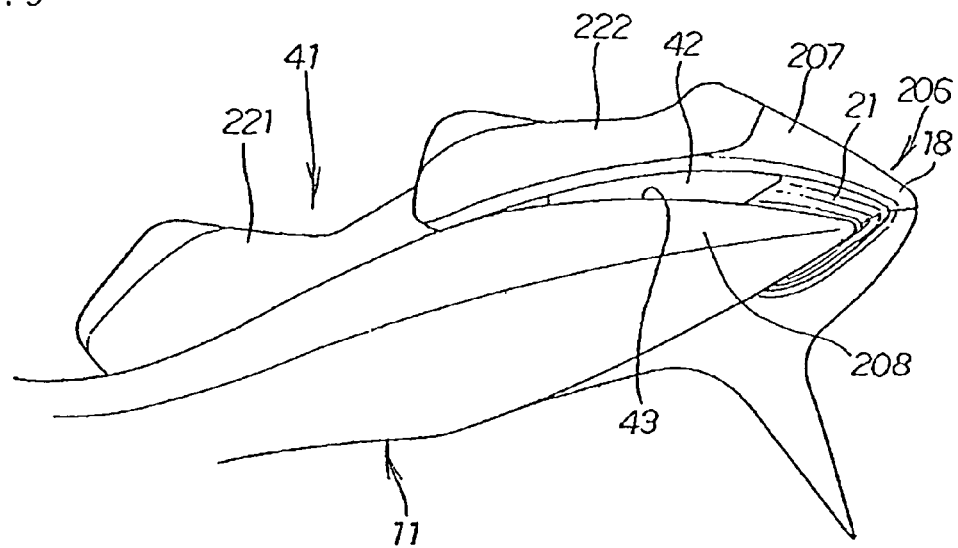
FIG. 5 is a side view of a rear end portion of the vehicle of FIG. 1, showing the tandem seat with the pillion portion in a closed configuration.

FIG. 5 is a side view of the rear end of the vehicle 10 according to the present invention where the tandem seat 41 is divided into a rider seat 221 and a pillion 222. The pillion 222 can be opened or closed independently of the rider seat 221.

The left and right rear combination lamps 21, 22 (only numeral 21 on the nearer side is shown) are located behind the openings 43, 43 (only numeral 43 on the nearer side is shown) provided between the upper seat cowl 207 and the lower seat cowl 208.

In a conventional vehicle, a rear combination lamp is housed in a dent made in a rear cowl. For this reason, the rear cowl tends to be complicated in shape and expensive to manufacture.

In this respect, according to the present invention, since the rear combination lamps 21, 22 are located in the openings 43, there is no need to make a dent in the seat cowl 206; and even if a dent is made, a shallow dent may be enough. Consequently, the shape of the seat cowl 206 is simple and the manufacturing cost for the body cover 11, including the seat cowl 206, can be reduced.

Operation of the pillion 222 will be described next.

Figure 6:
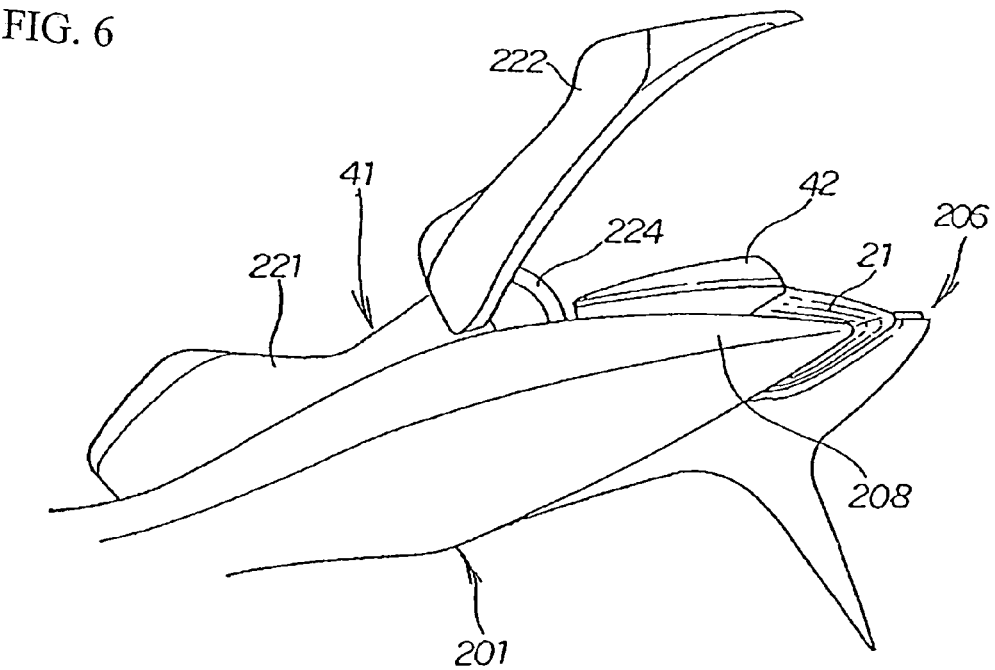
FIG. 6 is a side view of a rear end portion of the vehicle of FIG. 1, showing the tandem seat with the pillion portion in an open configuration.

FIG. 6 is a functional view showing how a pillion according to the present invention works, where the pillion 222 is independent of the rider seat 221 and can be opened and closed by means of a hinge 224.

In a conventional vehicle, the tandem seat is a seat which continuously integrates a rider seat and a pillion, whereby the tandem seat may be large and heavy.

In this respect, the present invention uses the tandem seat 41 in which the rider seat 221 and the pillion 222 are separated, and the pillion 222 is movable relative to the rider seat 221. Consequently the pillion 222 is small and lightweight and thus can be opened and closed very easily.

Figure 7:
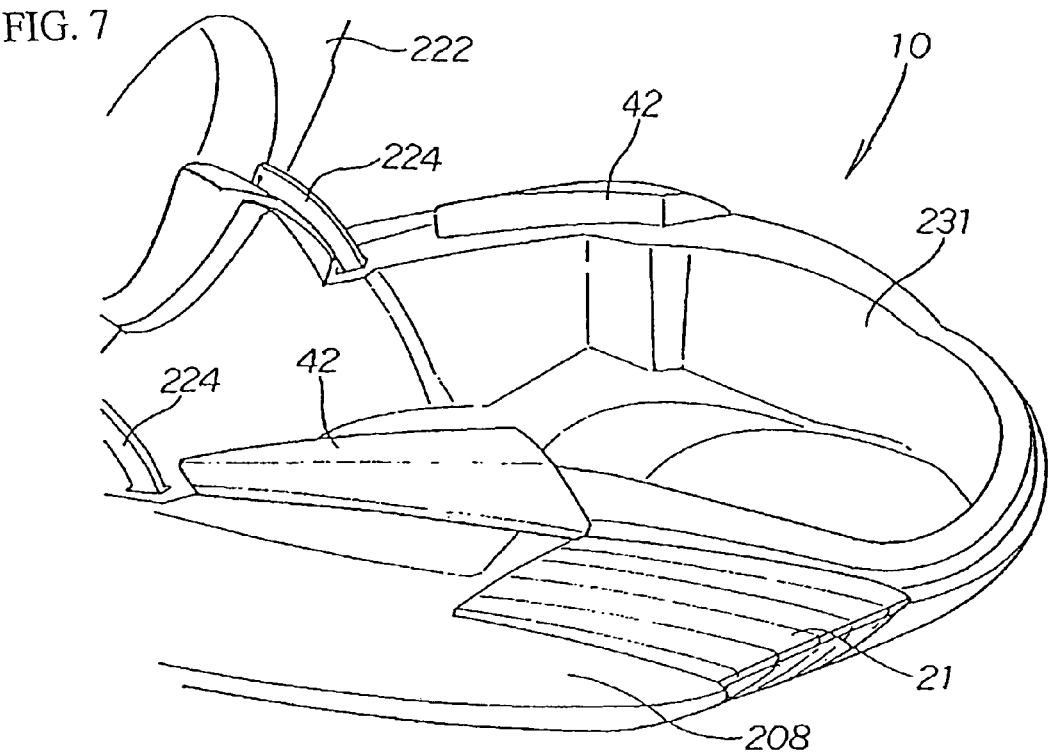
FIG. 7 is a rear perspective view of the vehicle of FIG. 1, showing the pillion portion of the tandem seat in an open configuration, and showing a large storage area disposed below the tandem seat.

FIG. 7 is a rear perspective view of the vehicle 10 according to the present invention in which the pillion 222 is open. As seen in this view, the rear of the vehicle 10 includes a storage part 231 for housing articles which is located in the back of the body, the pillion 222 which covers the storage part 231 in such a way so as to be able to be opened or closed, and a lower seat cowl 208 which constitutes a part of a seat cowl covering the bottom of the pillion 222. The grab rails 42, 42, used by a passenger to grab the cover, are provided on the back of the body frame. In this embodiment, the storage part 231 is sized and shaped to permit housing of two helmets.

Figure 8:
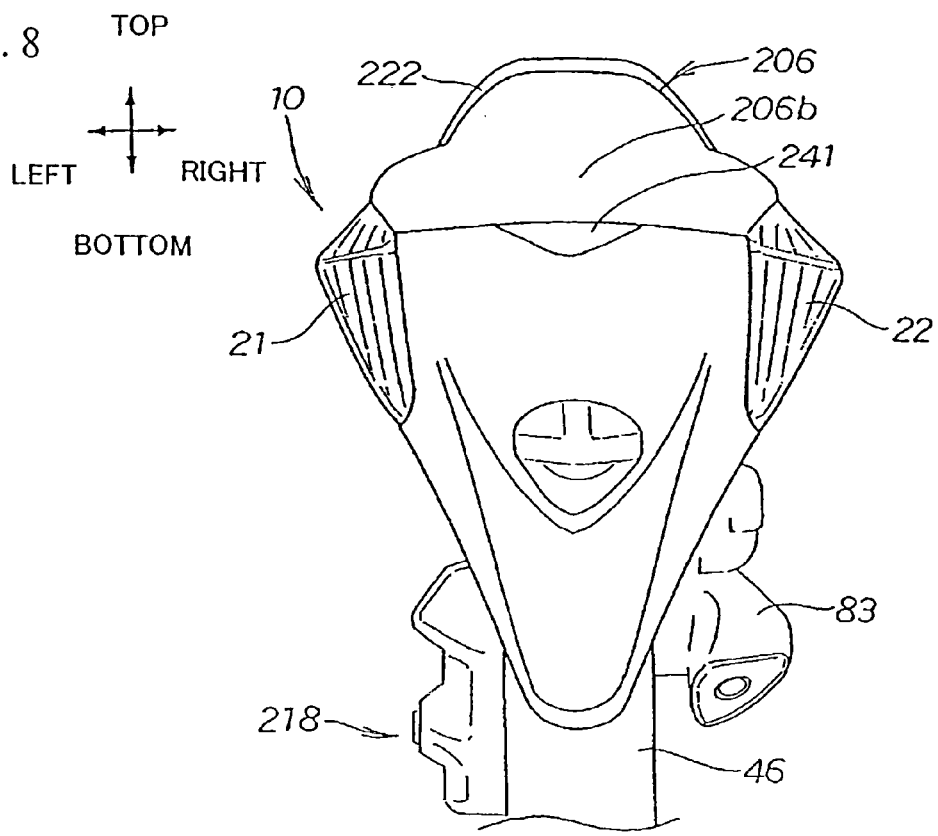
FIG. 8 is a rear view of the vehicle of FIG. 1, showing an open/close switch for the pillion disposed on a rear end of the seat cowl between the rear combination lamps.

FIG. 8 is an external view of the rear of the vehicle 10 according to the present invention. An open/close switch 241 for opening or closing the pillion 222 is provided on the rear end 206b of the seat cowl 206. Since the open/close switch 241 for opening or closing the pillion 222 is provided on the rear end 206b of the seat cowl 206, the pillion 222 can be easily opened or closed on either of the lateral sides of the vehicle 10. This improves ease of handling of the pillion 222 during opening or closing thereof.

Figure 9:
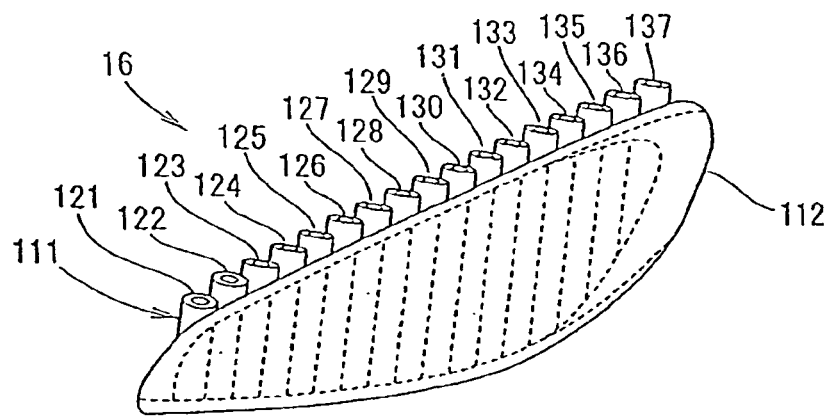
FIG. 9 is a front view of a front blinker of the vehicle of FIG. 1, showing the lamp housing including plural LED holders.

FIG. 9 is a front view of a front blinker 16 according to the present invention where the front blinker 16 includes a plurality of LEDs 140 (FIG. 13), a lamp housing 111, with a plurality of LEDs on its top, which forms a reflector to reflect light from the LEDs; and a cut lens 112 attached to the front of the lamp housing 111. The lamp housing 111 includes a plurality of LED holders 121-137 formed thereon, and the LEDS 140 are respectively fitted on the top of these LED holders. In the depicted embodiment, the LED holders 121-137 are provided as hollow cylindrical tubes extending upwardly from an upper wall 160 (FIG. 13) of the lamp housing. Each of the LED holders 121-137 has a respective through hole 161-177 formed centrally therethrough, as illustrated by the through hole 168 of the LED holder 128 in the example of FIG. 13.

The front blinker 17 (see FIG. 2) is symmetrical to the front blinker 16, (structural mirror image thereof) and is otherwise structurally the same as the front blinker 16. Thus, redundant description of front blinker 17 is omitted here.

Figure 10:
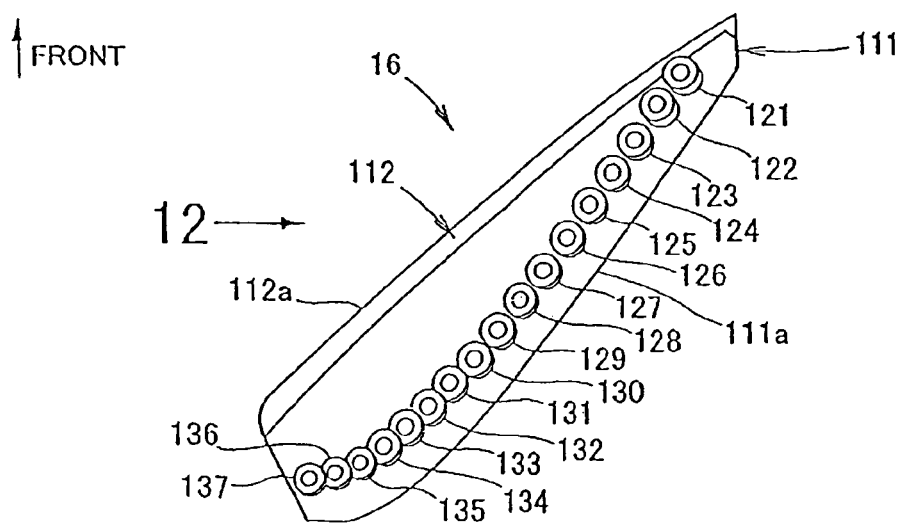
FIG. 10 is a top view of a front blinker of the vehicle of FIG. 1, showing that the LED holders are arranged along a back surface of the lamp housing.

FIG. 10 is a top view of a front blinker 16 according to the present invention, in which the arrow "FRONT" in the figure indicates the forward direction of the vehicle. As seen in FIG. 10, the width of the front blinker 16 decreases toward the body center (right in the figure, also referred to as a first end) of the lamp housing 111 and gradually increases toward the vehicle's lateral side (left in the figure, also referred to as a second end), extending both sideward of the vehicle and obliquely backward. The LED holders 121-137 on the top of the lamp housing 111 are arranged along the back surface 111a of the lamp housing 111. The front surface 112a of the lens 112, attached to the lamp housing 111, also extends both sideward of the vehicle and obliquely backward.

Figure 11:
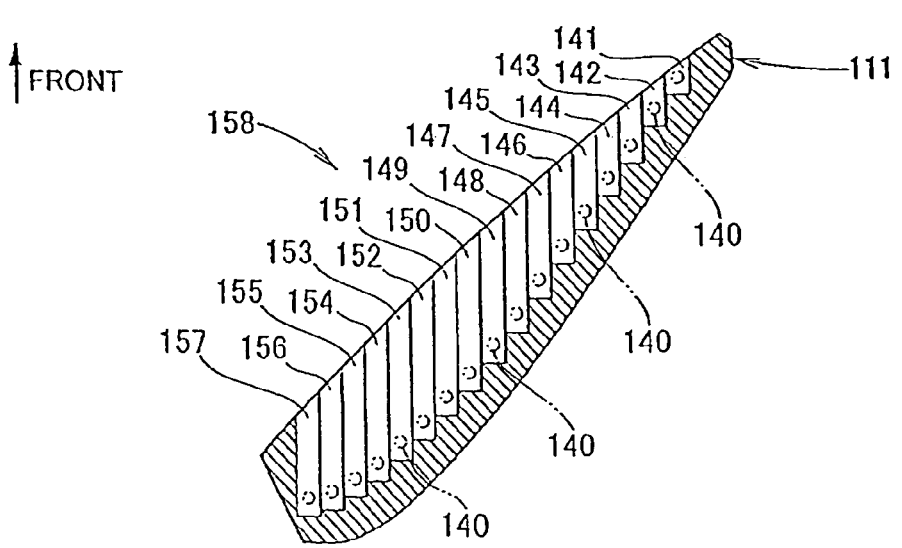
FIG. 11 is a sectional view of a front blinker of the vehicle of FIG. 1, showing the reflector within the lamp housing.
Figure 12:
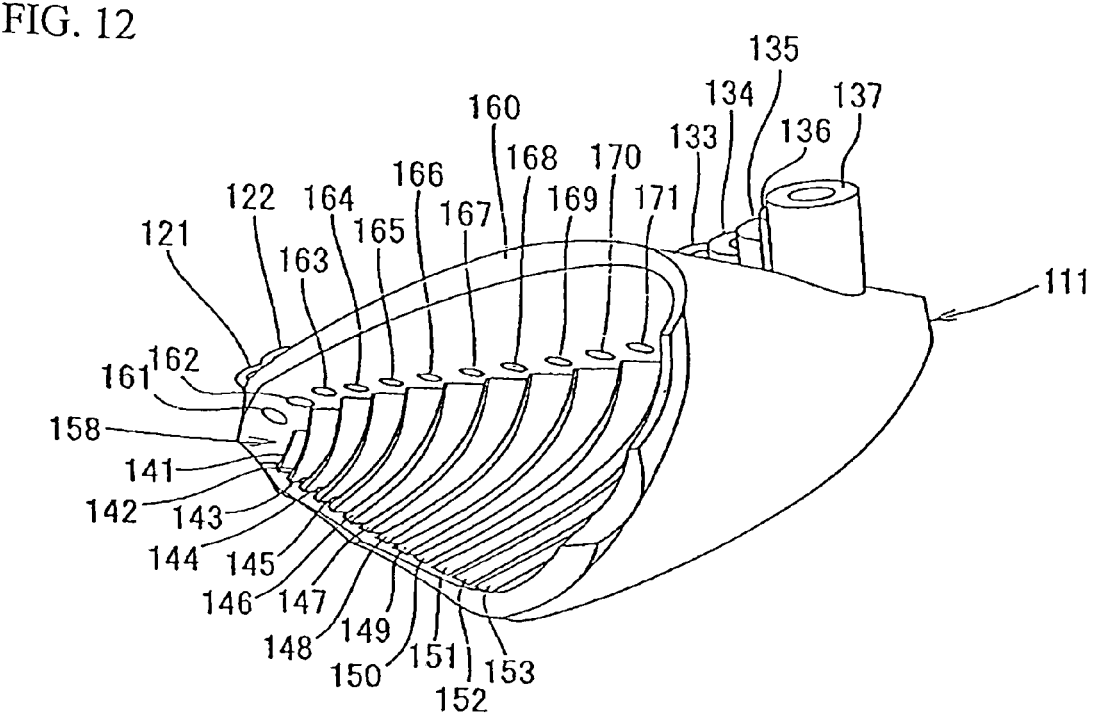
FIG. 12 is a perspective view of the lamp housing taken in the direction of arrow 12 in FIG. 10, showing the curved surfaces of the reflector.

FIG. 11 is a sectional view of a front blinker 16 according to the present invention, taken along a substantially horizontal plane, and seen from the same direction and vantage point as the illustration of FIG. 10. The lamp housing 111 of the front blinker 16 has belt-like curved surfaces 141-157 arranged to form a staircase-shaped pattern in the lamp housing along the vehicle width direction, in order to reflect light from the LEDs 140 (indicated by phantom lines) fitted onto the LED holders 121-137 (see FIG. 5) at the front end of the vehicle. These curved surfaces 141-157 cooperate to define a reflector 158. FIG. 12 is a left side view of the blinker 16, taken in the direction of arrow 12 in FIG. 10 and in which the lens 112 is omitted for purposes of illustration, showing the curved surfaces of the reflector 158.

As further seen in FIG. 12, the through holes 161-177 (only numerals 161-171 are shown) provide light passages extending through the LED holders 121-137 (only numerals 121, 122 and 133-137 are shown). The through holes 161-177 extend through both the respective LED holders and the upper wall 160 on the top of the lamp housing 111. The curved surfaces 141-157 (only 141-153 are shown), which are concave inner surfaces, are respectively located under these through holes 161-177. The LEDs 140 are fitted onto the LED holders 121-137, respectively. The LEDs 140 are supported and arranged parallel to each other on the lamp housing, and the through holes 161-177 guide light emitted from the LEDs 140 (see FIG. 14A) through the LED holders 121-137, and to the curved surfaces 141-157 in a direction substantially parallel to a vertical plane.

Figure 13:
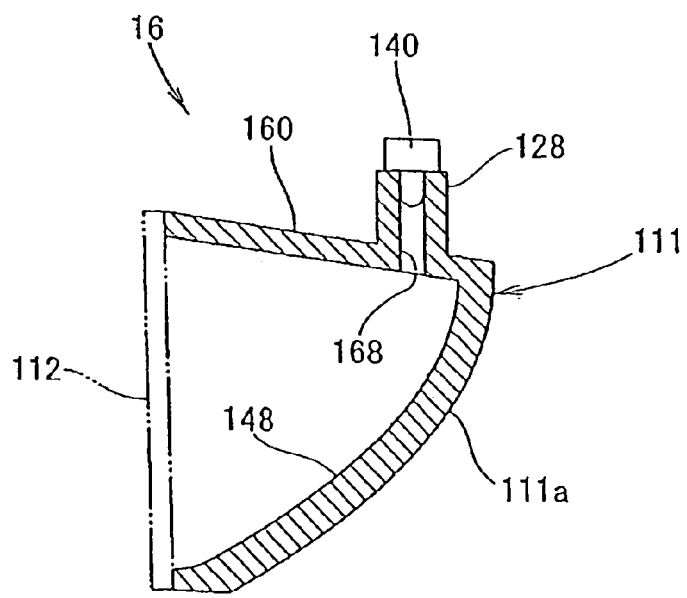
FIG. 13 is a sectional view of the lamp housing, showing an LED mounted at an upper end of an LED holder so as to direct light at a curved surface of the lamp housing.

FIG. 13 is a sectional view of a lamp housing 111 according to the present invention (taken vertically through the curved surface 148) showing that the LED holder 128 is formed extending upwardly from the upper wall 160 of the lamp housing 111. In addition, an LED 140 is fitted onto the LED holder 128, and the LED 140 is made to face the curved surface 148 through the through hole 168, so that the LED 140 is located in an area invisible from the direction in which light is reflected by the reflector curved surface 148.

The cross sections taken vertically through the other curved surfaces 141-147 and 149-157 (see FIG. 6) are the same as the cross section taken vertically through the curved surface 148, and redundant description thereof is therefore omitted.

Next, a description of how the front blinkers 16, 17 work will be provided.

Figure 14B:
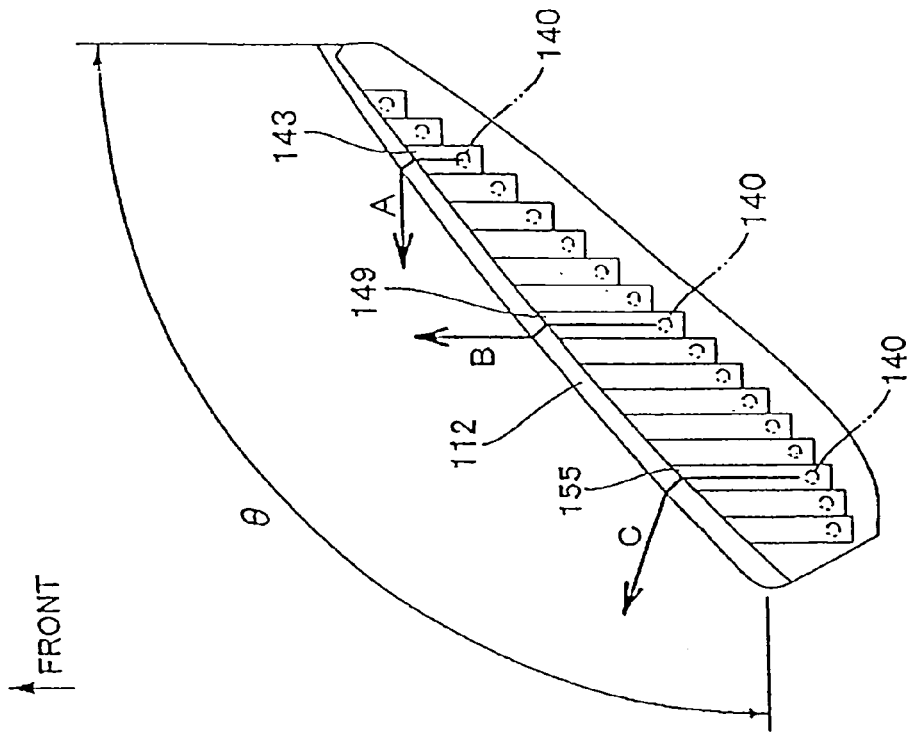
FIG. 14(b) is a horizontal sectional view of the lamp housing, FIGS. 14(a) and (b) showing direction of light travel through the lamp housing and lens, as represented by arrows.
Figure 14A:
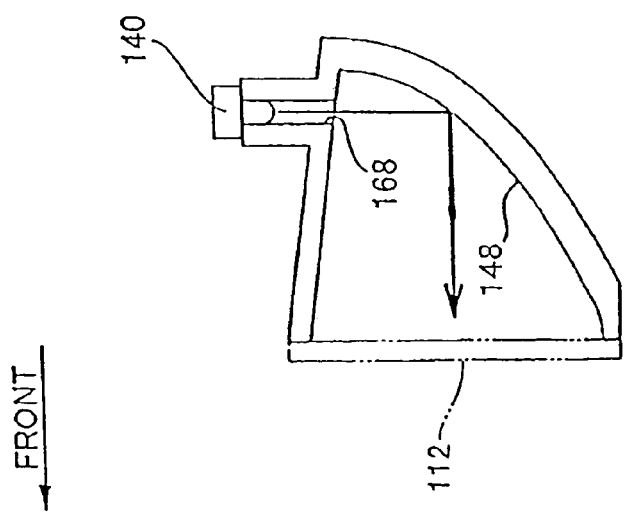
FIG. 14(a) is a side sectional view of the lamp housing.
Figure 15:
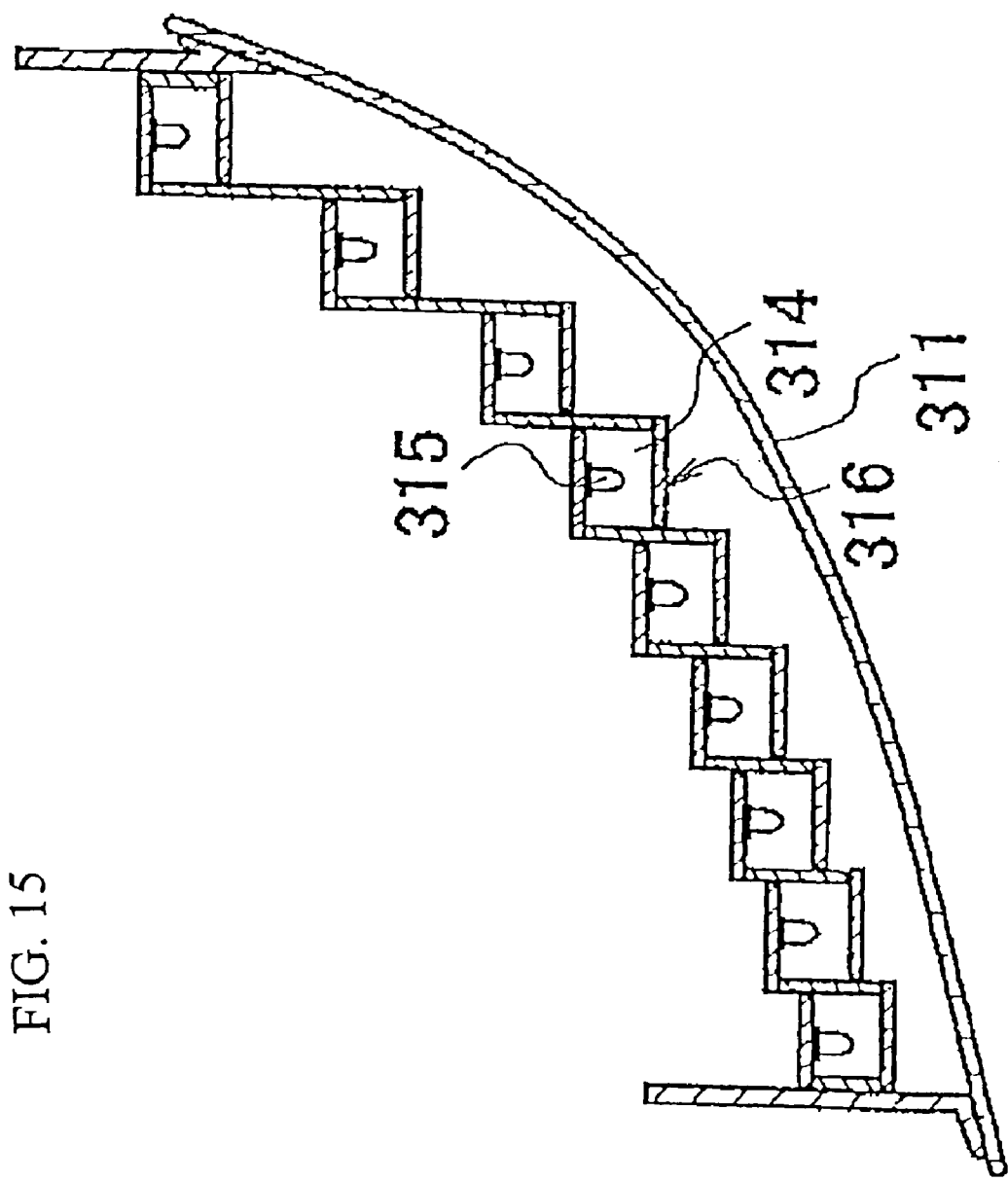
FIG. 15 is a horizontal sectional view of a conventional lamp housing using LEDs as a light source.

FIGS. 14A and 14B are functional views showing how a front blinker according to the present invention works.

In FIG. 14A, when an LED 140 is lit, light from the LED 140 passes through the through hole 168 and reaches the curved surface 148, then the light is reflected substantially transversely by the curved surface 148 and goes forward of the vehicle, as indicated by the arrow. Since the LED 140 cannot be seen through the lens 112, the appearance of the front blinker 16, 17 is improved.

In FIG. 14B, when each LED is lit, for example, as indicated by arrow A, light from the LED 140 is reflected by the curved surface 143 and goes forward of the vehicle; then it is refracted by the cut of the lens 112 and goes sideward of the vehicle. Also, as indicated by arrow B, light is reflected by the curved surface 149 and goes forward of the vehicle; then it is refracted by the cut of the lens 112 and continues to go forward of the vehicle. Also, as indicated by arrow C, light is reflected by the curved surface 155 and goes forward of the vehicle; then it is refracted by the cut of the lens 112 and goes sideward of the vehicle and obliquely forward.

In this way, light emitted from all the LEDs 140 and refracted by the lens 112 goes within the range of angle θ and is visible from a direction within this angle θ. The angle θ is, for example, approximately 90 degrees.

As shown in FIGS. 9, 11 and 13, a first aspect of the present invention is characterized in that in front blinkers 16, 17 as turn signal lamps for a vehicle, include a lamp housing 111, LEDs 140 provided on the lamp housing 111, curved surfaces 141-157 to reflect light from the LEDs 140, and a lens 112 fitted in an opening of the lamp housing 111. The reflector 158 has a plurality of concave curved surfaces 141-157 as reflecting surfaces, and the LEDs 140 are located in an area invisible from a direction in which light is reflected by these curved surfaces 141-157. Since the LEDs 140 are invisible when the front blinkers 16, 17 are seen from outside, the appearance of the vehicle is improved.

A second aspect of the present invention is characterized in that a plurality of curved surfaces 141-157 are arranged in a staircase pattern in the vehicle width direction as viewed from above. One curved surface is provided for each LED 140, and a lens surface, namely the front surface 112a of a lens 112 extends both sideward of the vehicle and obliquely backward. Since reflected light of the LED 140 is visible from forward of the vehicle, the visibility of the front blinkers 16, 17 is improved.

A third aspect of the present invention is characterized in that the LEDs 140 are located on the top of the lamp housing 111. The LEDs 140 on the top of the lamp housing 111 are substantially invisible from a position higher than the front blinkers 16, the appearance of the vehicle 10 is thus improved.

Although in the disclosed embodiment, one curved surface is provided for each LED, the present invention is not limited thereto; it is also possible to provide more than one curved surface for each single LED, or one curved surface for more than one LED.

Turn signal lamps according to the present invention are suitable for motorcycles.

While a working example of the present invention has been described above, the present invention is not limited to the working example described above, but various design alterations may be carried out without departing from the present invention as set forth in the claims.

What is claimed is:

1. A turn signal lamp for a vehicle, the turn signal lamp comprising:
   a lamp housing comprising:
      a hollow main body having an opening formed therein and having an interior surface defining a reflector which is configured and arranged to reflect light during operation of the lamp;
      a plurality of tubular LED holders integrally formed with said main body of said housing and extending outwardly thereon;
      plural LEDs provided on the lamp housing, each of said LEDs comprising an illuminating portion, wherein each of said LED holders is provided with a respective one of said LEDs; and
   a lens fitted into the opening of the lamp housing, wherein:
      the reflector comprises a plurality of concave curved surfaces which function as reflecting surfaces, and
      the LEDs are disposed on the lamp housing at a location where the illuminating portion of each LED is concealed when the lamp is viewed from a direction in which light is reflected by the plurality of concave curved surfaces.

2. The turn signal lamp for a vehicle according to claim 1, wherein
   the plurality of concave curved surfaces are arranged in a staircase pattern in a vehicle width direction as viewed from above,
   one curved surface is provided for each one of the plural LEDs, and
   a surface of the lens extends both sideward of the vehicle and obliquely rearward.

3. The turn signal lamp for a vehicle according to claim 1, wherein the LEDs are located on the top of the lamp housing.

4. The turn signal lamp for a vehicle according to claim 2, wherein the LEDs are located on the top of the lamp housing.

5. The turn signal lamp for a vehicle according to claim 1, wherein each of the plurality of tubular LED holders is configured to support a respective one of the LEDs and to direct light emitted therefrom in a vertical direction.

6. The turn signal lamp for a vehicle according to claim 1, wherein each of the plurality of tubular LED holders directs light emitted from the respective LED in a substantially vertical direction toward the reflector, and wherein the reflector in turn redirects the light emitted from the respective LED in a substantially horizontal direction.

7. The turn signal lamp for a vehicle according to claim 1, wherein the plural LEDs are supported and arranged such that longitudinal axes thereof are parallel to each other on the lamp housing so as to direct light emitted from the LEDs in a direction substantially parallel to a vertical plane.

8. The turn signal lamp for a vehicle according to claim 1, wherein, in a horizontal section, the lamp housing is tapered in shape so as to comprise a laterally inward first end relative to a central portion of the vehicle in an installed configuration of the lamp, and a laterally outward second end relative to the central portion of the vehicle in the installed configuration of the lamp, wherein said first end is disposed opposite to said second end, and wherein the first end is narrower than the opposed laterally outward second end.

9. The turn signal lamp for a vehicle according to claim 8, wherein the lamp housing comprises a forward facing end having an opening formed therein, and wherein the lens resides in said opening, the lens oriented so as to extend between the laterally inward first end and the laterally outward second end and so as to extend obliquely toward the rear of the vehicle.

10. The turn signal lamp for a vehicle according to claim 8, wherein the plurality of tubular LED holders are arranged along a rear surface of the lamp housing.

11. A turn signal lamp for a vehicle, the turn signal lamp comprising:
   a lamp housing having an opening formed therein;
   plural LEDs supported on the lamp housing;
   a plurality of tubular LED holders, wherein each of said LED holders is provided with a respective one of said LEDs, each of said LEDs comprising an illuminating portion;
   a reflector housed in the lamp housing, wherein said reflector reflects light from the LEDs, the reflector comprising at least one curved reflecting surface; and
   a lens fitted into the opening of the lamp housing, wherein:
      the LEDs are disposed on the lamp housing at a location where the illuminating portion of each LED is concealed when the lamp is viewed from a direction in which light is reflected by the at least one curved reflecting surface.

12. The turn signal lamp for a vehicle according to claim 11, wherein:
   said at least one curved reflecting surface comprises a plurality of curved reflecting surfaces, a curved reflecting surface is provided for each one of the plural LEDs, and the plurality of curved reflecting surfaces are arranged in a staircase pattern in a vehicle width direction as viewed from above.

13. The turn signal lamp for a vehicle according to claim 11, wherein a surface of the lens extends both sideward of the vehicle and obliquely rearward.

14. The turn signal lamp for a vehicle according to claim 11, wherein said at least one curved reflecting surface is a concave inner surface.

15. The turn signal lamp for a vehicle according to claim 11, wherein each one of the tubular LED holders supports a respective one of said LEDs such that the light emitted from the LEDs is directed in a substantially vertical direction toward the reflector, and wherein the reflector in turn redirects the light emitted from the LED in a substantially horizontal direction.

16. The turn signal lamp for a vehicle according to claim 15, wherein the light reflected from the reflector is directed through the lens, and wherein the lens is configured to further change the direction of the light, the further change of direction depending on the incidence location of the reflected light upon the lens.

17. A turn signal lamp for a vehicle, the turn signal lamp comprising:
- a lamp housing having an opening formed therein and having a hollow space formed therein defining an interior;
- a lens fitted into the opening of the lamp housing; and
- a plurality of LEDs provided on and operatively attached to the lamp housing;

said lamp housing comprising:
- a reflector formed in the interior of said lamp housing, said reflector comprising a plurality of concave curved surfaces configured and arranged to reflect light from the LEDs during operation of the lamp;
- a plurality of substantially parallel tubular LED holders for the respective LEDs, each of the LED holders having at least one supporting aperture formed in an upper end thereof and a through hole extending downwardly from said supporting aperture;

wherein the LEDs are respectively disposed on the upper ends of said LED holders adjacent said supporting apertures of the LED holders; and wherein the LEDs are disposed on the lamp housing such that the LEDs are concealed when the lamp is viewed from a direction in which light is reflected by the plurality of concave curved surfaces.

18. The turn signal lamp for a vehicle according to claim 17, wherein each one the plurality of LED holders supports respective one of the LEDs such that the light emitted from the LEDs is directed in a substantially vertical direction toward the reflector, and wherein the reflector in turn redirects the light from the LEDs in a substantially horizontal direction.

19. The turn signal lamp for a vehicle according to claim 18, wherein the light reflected from the reflector is directed through the lens, and wherein the lens is configured to further change the direction of the light, the further change of direction depending on the incidence location of the reflected light upon the lens.

20. The turn signal lamp for a vehicle according to claim 17, wherein each of the LEDs comprises a narrow illuminating portion which fits inside of the supporting aperture of the respective LED holder, and wherein light emitted from the LEDs is guided through the through holes of the LED holders to the curved surface.

* * * * *